United States Patent
Deval et al.

(10) Patent No.: US 9,735,820 B2
(45) Date of Patent: Aug. 15, 2017

(54) MULTI-CURRENT HARMONIZED PATHS FOR LOW POWER LOCAL INTERCONNECT NETWORK (LIN) RECEIVER

(71) Applicant: Microchip Technology Incorporated, Chandler, AZ (US)

(72) Inventors: Philippe Deval, Lutry (CH); Marija Fernandez, Lausanne (CH); Patrick Besseux, Mont-sur-Rolle (CH)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 955 days.

(21) Appl. No.: 13/842,386

(22) Filed: Mar. 15, 2013

(65) Prior Publication Data
US 2014/0269996 A1   Sep. 18, 2014

(51) Int. Cl.
| | |
|---|---|
| *H04B 1/16* | (2006.01) |
| *H04L 12/40* | (2006.01) |
| *H04L 25/02* | (2006.01) |

(52) U.S. Cl.
CPC ..... *H04B 1/1607* (2013.01); *H04L 12/40039* (2013.01); *H04L 25/0264* (2013.01); *H04L 2012/40234* (2013.01); *Y02B 60/32* (2013.01)

(58) Field of Classification Search
CPC ............ H04B 1/1607; H04L 12/40039; H04L 25/0264; H04L 2012/40234
USPC .......................................... 324/705; 375/316
See application file for complete search history.

(56) References Cited

U.S. PATENT DOCUMENTS

| | | | | |
|---|---|---|---|---|
| 3,971,979 A | * | 7/1976 | Mayfield ................ | G05F 1/561 323/315 |
| 4,408,132 A | * | 10/1983 | Kuwahara ............ | H04B 1/1607 327/205 |
| 4,801,820 A | * | 1/1989 | Nootbaar ................ | G05F 3/227 326/33 |
| 4,942,399 A | * | 7/1990 | Buchholtz ............. | H03M 1/129 341/135 |
| 5,018,041 A | * | 5/1991 | Szepesi ............. | H03K 17/0822 361/18 |
| 5,510,943 A | | 4/1996 | Fukunaga ....................... | 361/18 |
| 5,880,614 A | | 3/1999 | Zinke et al. ................. | 327/205 |

(Continued)

FOREIGN PATENT DOCUMENTS

EP    1404078 A1    3/2004    ............ H04L 25/02

OTHER PUBLICATIONS

Atmel, LIN Bus Transceiver with Integrated Voltage Regulator ATA6629 ATA6631 datasheet, 2010, Atmel, 9165B-AUTO-05/10, p. 1, 4, 17.*

(Continued)

*Primary Examiner* — Melissa Koval
*Assistant Examiner* — Rahul Maini
(74) *Attorney, Agent, or Firm* — Slayden Grubert Beard PLLC (57) ABSTRACT

A LIN receiver includes a single, low power structure for both sleep and silent modes, with a single comparator for detecting LIN signaling during both sleep and silent modes as well as during active mode. In some embodiments, full receiving capability is implemented with a current as low as 5 microamps. In particular, dominant and recessive levels for the wakeup bloc are identical to those of standard LIN levels, fixed at about 3.5 V. Consequently, full LIN receiving capability is available during sleep mode.

44 Claims, 8 Drawing Sheets

(56) References Cited

U.S. PATENT DOCUMENTS

| | | | | | |
|---|---|---|---|---|---|
| 6,470,248 | B2* | 10/2002 | Shank | ............... | B60G 17/0185 280/6.157 |
| 6,894,501 | B1* | 5/2005 | Flasck | ................. | G11C 29/028 324/416 |
| 7,715,579 | B2* | 5/2010 | Owada | ................. | H04R 25/353 381/312 |
| 7,816,949 | B2* | 10/2010 | Ishikawa | ............ | H04L 25/0264 326/30 |
| 7,859,810 | B2* | 12/2010 | Saitou | ............... | G01R 31/2635 361/56 |
| 8,102,164 | B2* | 1/2012 | Colbeck | ............. | H02M 1/4225 323/271 |
| 2010/0090702 | A1* | 4/2010 | McMillen | ......... | G01R 31/3624 324/426 |
| 2010/0106991 | A1* | 4/2010 | Noller | .............. | H04L 12/40039 713/323 |
| 2010/0231288 | A1* | 9/2010 | Horn | ................. | H03K 19/0016 327/524 |
| 2013/0065584 | A1* | 3/2013 | Lyon | .................... | H04W 28/06 455/434 |

OTHER PUBLICATIONS

International Search Report and Written Opinion, Application No. PCT/US2014/019733, 11 pages, Aug. 4, 2014.
European Office Action, Application No. 14711383.1, 3 pages, Jun. 24, 2016.
European Office Action, Application No. 14711383.1, 4 pages, Dec. 2, 2016.

* cited by examiner

MULTI-CURRENT HARMONIZED PATHS FOR LOW POWER LOCAL INTERCONNECT NETWORK (LIN) RECEIVER

BACKGROUND

Technical Field

The present disclosure relates to local interconnect networks (LIN) and, particularly, to local interconnect network receivers.

Description of the Related Art

The Local Interconnect Network (LIN) is a serial network protocol used for communicating between components in vehicles. It is defined as a time-triggered, master-slave network, eliminating the need for arbitration among simultaneously reporting devices. It is implemented using a single wire communications bus, which reduces wiring and harness requirements and thus helps save weight, space and cost.

Defined specifically for low-cost implementation of vehicle sub-network applications by the LIN Consortium, the LIN protocol achieves significant cost reduction since it is fairly simple and operates via an asynchronous serial interface (UART/SCI), and the slave nodes are self-synchronizing and can use an on-chip RC oscillator instead of crystals or ceramic resonators.

In order to maintain total current consumption in a LIN network at acceptable levels, increasing the number of slave nodes in a LIN network requires lower and lower current consumption for each of the nodes.

LIN network operational modes include an active mode with full receiving and transmitting capability; a silent (low-power) mode, in which full receiving capability, but no transmitting capability, is provided; and a sleep (power-down) mode, in which only waking-up capability is enabled. Current consumption in silent mode is about 50 microamps, while that in sleep mode is about 5-10 microamps. Thus, a consumer needing only receiving capability has to operate in silent mode, consuming 50 microamps.

Usually, the silent mode and the sleep mode functionality are implemented using distinct dedicated blocs in a given integrated circuit.

In particular, LIN bus signaling thresholds for "dominant" (logic low) and "recessive" (logic high) levels are centered on half the battery voltage (Vbat/2), with a 0.1 Vbat hysteresis typically required. That is, the recessive-to-dominant threshold is approximately 0.45*Vbat, while the dominant-to-recessive threshold is approximately 0.55*Vbat. Consequently, a window comparator is required to identify bus signals. However, Vbat can range from 6-30 V, which requires wide common mode range compliance for a window comparator. That is, Vbat/2 (and the LIN signal) voltages can dramatically exceed the input voltage range of a window comparator during voltage modes (i.e., silent and operational). As a consequence, matched voltage dividers are commonly used to generate matched fractions of the Vbat/2 and LIN voltages that stay within the input voltage range of the window comparator.

Because significant overhead (a voltage regulator, external bias, etc.) around the voltage mode window comparator is required, overall current consumption of the LIN receiver in voltage mode exceeds requirements during sleep mode. Thus, the voltage mode LIN receiver comparator cannot be used as the wake circuit comparator.

In order to save power during sleep mode, the wake circuit comparator typically compares the LIN bus voltage to a transistor Vt (threshold voltage) or a sum of transistors Vt. This results in a very simple and low-power circuit, but on the other hand, it requires as well a constant detection level, in the range of 3.5-4V, rather than the standard half battery voltage Vbat/2. Thus the wake circuit cannot be used for receiving bus data.

SUMMARY

These and other drawbacks in the prior art are overcome in large part by a system and method according to embodiments of the present invention.

A LIN receiver in accordance with some embodiments includes a single, low power structure for both sleep and silent modes, with a single comparator for detecting LIN signaling during both sleep and silent modes as well as during active mode. In some embodiments, full receiving capability is implemented with a current lower than 10 microamps, and as low as 5 microamps. In particular, dominant and recessive levels for this receiver, when used as the wakeup bloc, are identical to those of standard LIN levels, half the battery voltage (Vbat/2), rather than fixed at about 3.5-4V for the basic wake receiver. Consequently, full LIN receiving capability is available during sleep mode.

A local interconnect network receiver, in accordance with embodiments includes a battery voltage input; an input from a local interconnect network (LIN) bus; and a current mirror configured to mirror a current defined by a reference resistor coupled to the battery voltage input in a sense resistor, such that a voltage at an output point of the sense resistor defines dominant and recessive states of the LIN bus in silent and sleep modes. A local interconnect network (LIN) receiver in accordance with embodiments includes a common circuit configured to detect dominant and recessive states of a LIN bus during active, silent and sleep modes. In some embodiments, the common circuit includes a current mirror configured to mirror a current defined by a reference resistor coupled to a battery voltage input in a sense resistor, such that a voltage at an output point of the sense resistor defines dominant and recessive states of the LIN bus.

A method, according to embodiments includes operating a local interconnect network (LIN) receiver in a sleep mode; operating the LIN receiver in a silent mode; wherein operating in the sleep mode and operating in the silent/active modes comprise detecting dominant and recessive states of a LIN bus using a common circuit. In some embodiments, the common circuit includes a current mirror configured to mirror a current defined by a reference resistor coupled to a battery voltage input in a sense resistor, such that a voltage at an output point of the sense resistor defines dominant and recessive states of the LIN bus.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

As noted above, typical LIN receiving circuits require separate circuitry for silent/active modes and sleep mode signal detection/functionality. As will be discussed in greater detail below, a LIN receiver in accordance with some embodiments includes a single, low power structure for both sleep and silent/active modes. In particular, dominant and recessive levels for the wakeup bloc are identical to those of standard LIN levels, fixed at half the battery voltage (Vbat/2). Consequently, full LIN receiving capability is available during sleep mode. That is, a single circuit is provided that meets all LIN requirements for sleep and silent/active mode operation in a compact structure.

Figure 1:
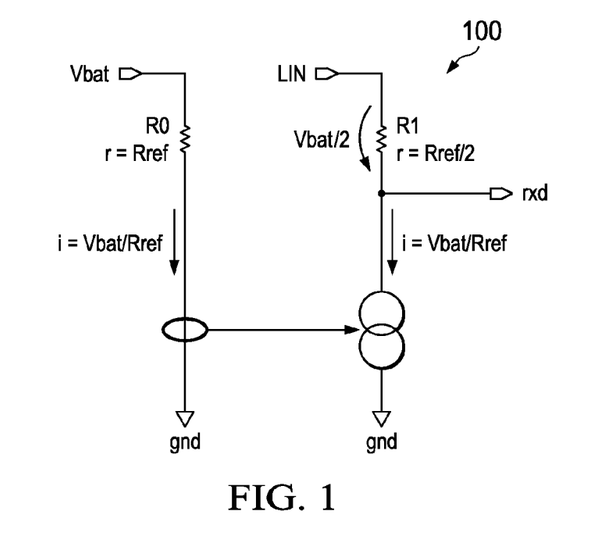
FIG. 1 is a diagram illustrating exemplary circuit operation.

Turning now to FIG. 1, a diagram illustrating operation of an embodiment of a LIN receiver input circuit 100 is shown. As will be explained in greater detail below, hysteresis is implemented through the mirroring ratio. A reference resistor R0 is coupled between Vbat and Ground (GND). A sense resistor R1 having half the value of the reference resistor (R0/2) is coupled to Vlin. The current in the reference resistor Vbat/R0. This current is mirrored in the sense resistor, inducing a voltage drop of Vbat/2. The voltage at the cold point of the sense resistor (Vrxd) is measured.

According to the LIN specification, when Vlin is greater than Vbat/2, the LIN bus is recessive, whereas if it is less than Vbat/2, it is dominant. Since Vrxd=Vlin−Vbat/2, when Vrxd is positive, the LIN bus is recessive, while when Vrxd is negative, the LIN bus is dominant.

Figure 2A:
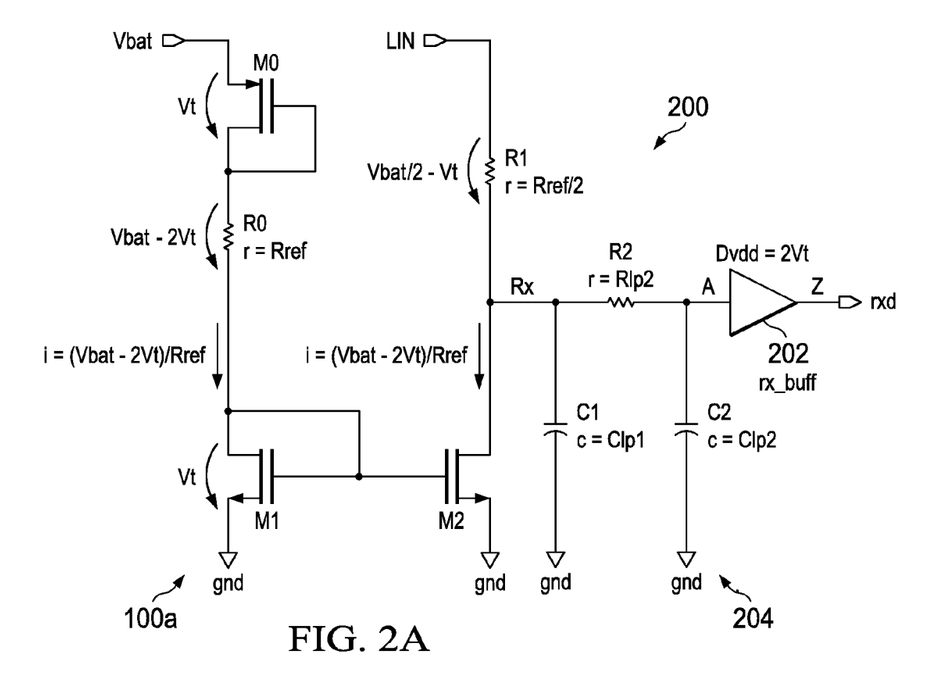
FIG. 2A-FIG. 2C are diagrams illustrating exemplary receivers according to various embodiments.

A simplified diagram of an exemplary receiver 200 in accordance with embodiments is shown in FIG. 2A. More particularly, the circuit includes a current mirror input 100a, similar to that of FIG. 1, a lowpass filter 204, and a digital output buffer 202. The current mirror circuit 100a includes a gain compensation diode-connected MOS M0 coupled between the reference resistor R0 and Vbat. Since the voltage across each of the diode-connected MOSFETs M0, M1 is Vt, the voltage across R0 is Vbat−2 Vt, and the current is (Vbat−2Vt)/R0. The voltage drop across the sense resistor R1 is then Vbat/2−Vt. The sense resistor R1's cold point RX is driven through the mirror output and is connected to the input of the lowpass filter 204. The digital output buffer 202 is supplied by a digital voltage equal to 2 Vt, as will be discussed in greater detail below. Its input threshold is therefore Vt. Thus, when Vlin is greater than Vbat/2, Vrx is greater than Vt and Rxd=1 (recessive). When Vlin is less than Vbat/2, Vrx is less than Vt, and Rxd=0 (dominant).

Figure 2B:
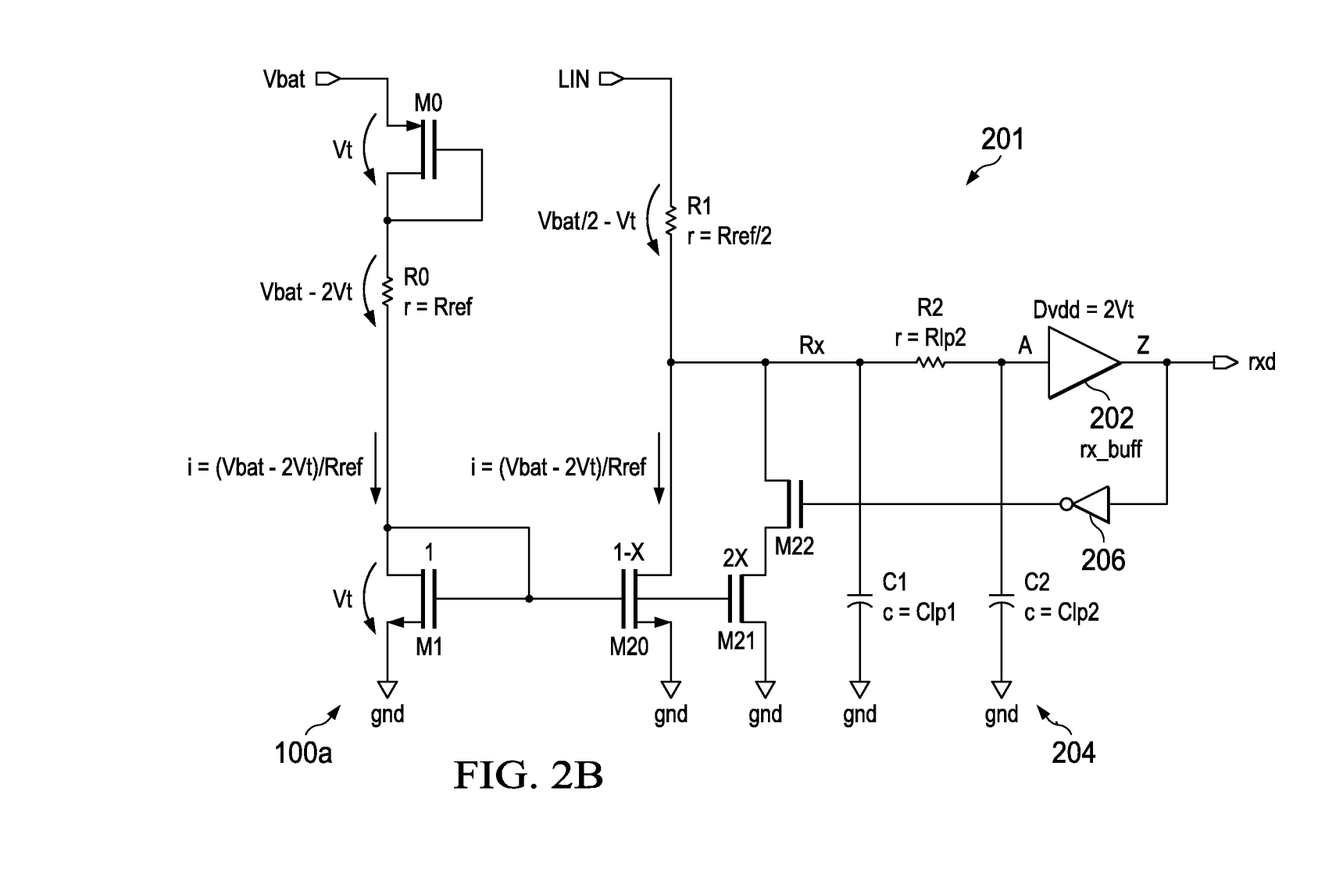

An x*Vbat hysteresis can be achieved by changing the fixed mirroring ratio of the current mirror to a RX level dependent ratio as shown in FIG. 2B. The M2 transistor of FIG. 2A is split into two transistors M20 and M21 providing, respectively, a mirroring ratio of (1−x) and 2x, and a switch M22 is added in series with M21. The switch M22 is driven through an inverter 206 that is controlled by the RX output rxd.

When RX output is recessive (high) the output of inverter 206 is low and the M22 switch is off. The voltage drop on R1 is thus (1−x) of its nominal value and the threshold is changed to (1−x)*Vbat/2+x*Vt, i.e., approximately (1−x) *Vbat/2 since Vt is small compared to Vbat. As soon as Lbus (LIN) falls below the (1−x)*Vbat/2, the RX output becomes low, the output of the inverter 206 goes high and M22 is turned "on". The threshold is thus changed to (1+x)*Vbat/ 2+x*Vt, i.e., approximately (1+x)*Vbat/2 since Vt is small compared to Vbat. This creates the x*Vbat hysteresis. In order to create the typical 10% Vbat hysteresis, x is thus set to 0.1. That is, the recessive-to-dominant threshold is approximately 0.45*Vbat, while the dominant-to-recessive threshold is approximately 0.55*Vbat.

Figure 2C:
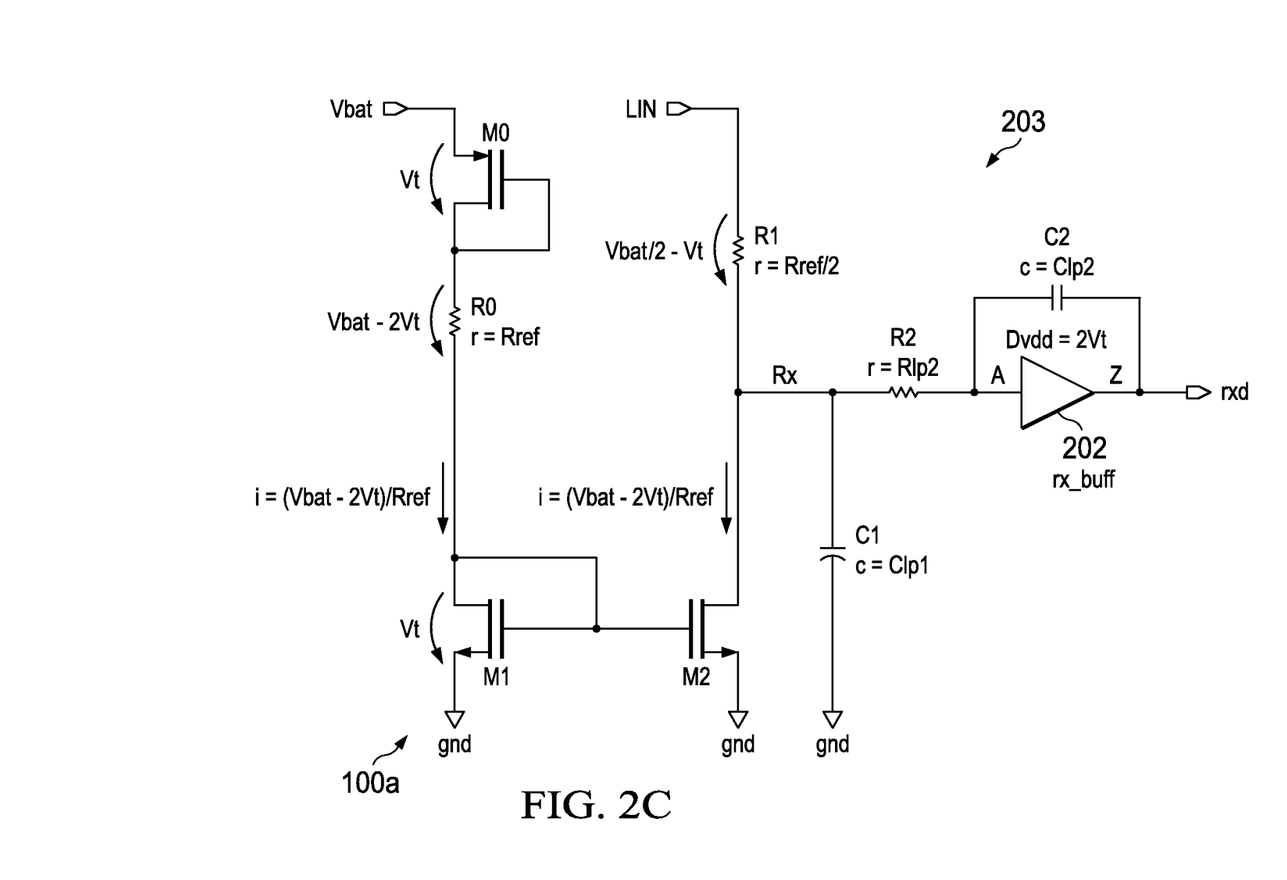

It is noted that, while a particular low pass filtering technique has been illustrated (low pass filter 204), many low pass filtering techniques may be employed. For example, active filtering as shown in FIG. 2C may be employed. In the example receiver 203 illustrated, the cold point of low pass filtering capacitor C2 (FIG. 2A) is connected to the z output of buffer 202. In other embodiments, the C1 cold point could be connected to z output of buffer 202 instead. Other configurations are possible.

Figure 3:
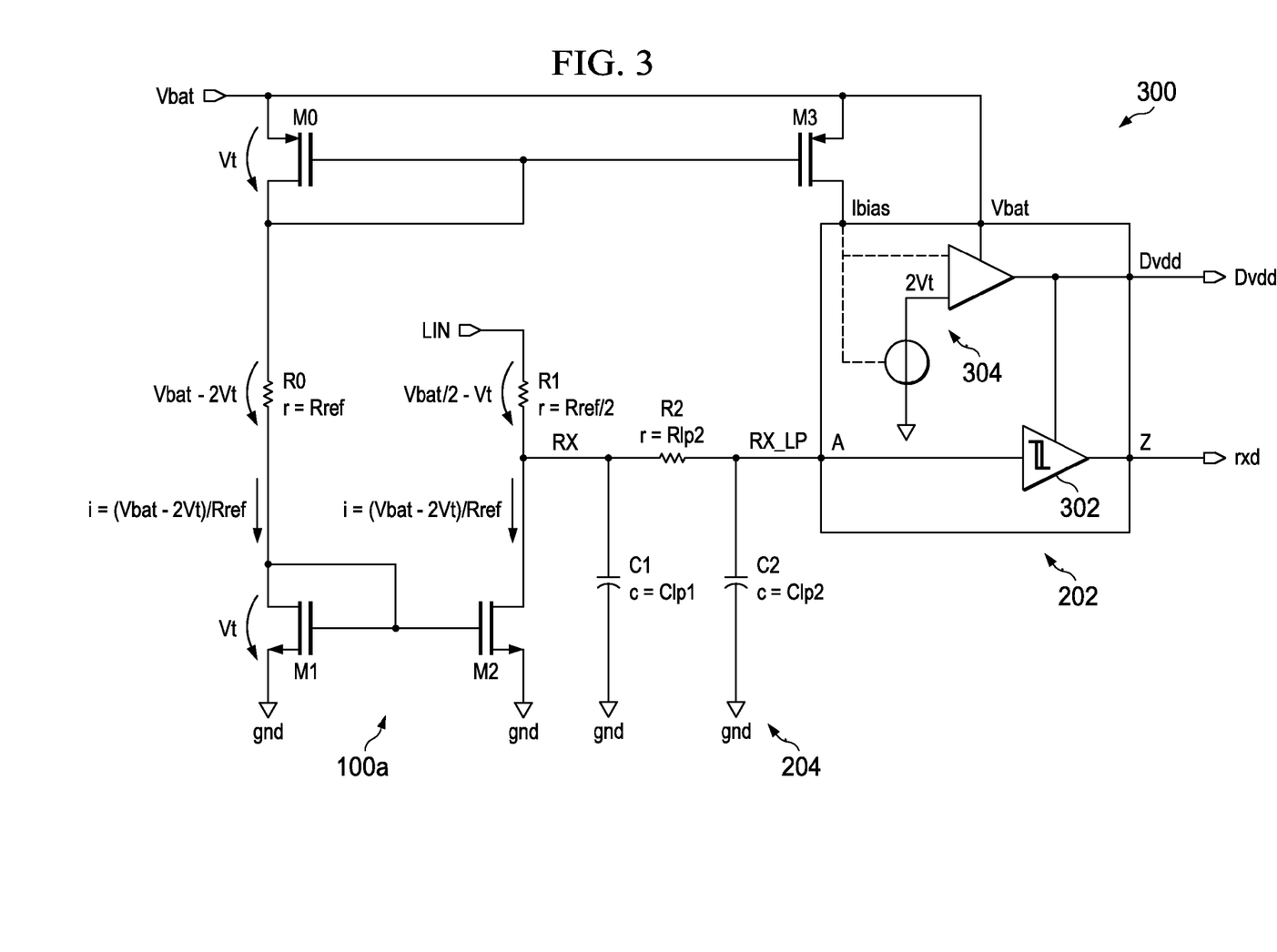
FIG. 3 is a diagram illustrating an exemplary receiver according to embodiments.

Another example of a receiver circuit in accordance with embodiments is shown with reference to FIG. 3. In particular, the circuit 300 illustrates digital output buffer 202 in greater detail. Generally similar to the circuit 200 of FIG. 2A, the circuit 300 includes a transistor M3 which supplies a current Ibias to supply 304, which generates the 2 Vt bias voltage Dvdd. The comparator 302 receives the output RX_LP of the lowpass filter 204 and has a threshold of Vt.

Figure 4:
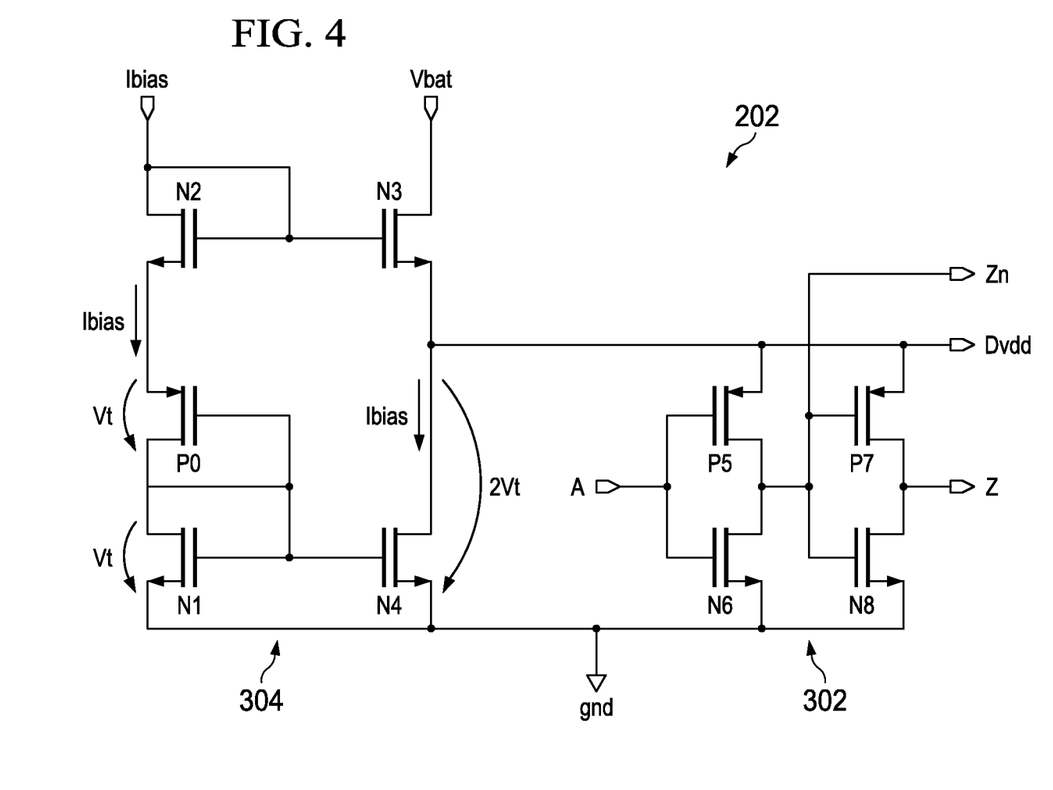
FIG. 4 is a diagram illustrating an exemplary supply and comparator circuit according to embodiments.

The Vdd supply and comparator is shown in greater detail in FIG. 4. As shown, the supply 304 includes transistors P0 and N1-N4 while the comparator includes transistors P5, P7, N6, and N8. The Vdd receives input current Ibias at transistor N2 and battery voltage Vbat at transistor N3. The P0 and N1 transistors generate the 2 Vt bias voltage corresponding to Vt across the M0 transistor of FIGS. 2A-2C and 3. N3 provides a buffered copy of this voltage at its source. N2 provides the gate voltage of N3, while N4 that mirrors the N1 current provides the required bias current Ibias for N3. The P5-N6 and P7-N8 transistors operate as two inverters in series operating as a comparator having a threshold of Vt (½*2 Vt). The output node of P5-N6 inverter may be used as the inverted output zn for driving the hysteresis monitoring switch M22 (FIG. 2B).

Figure 5:
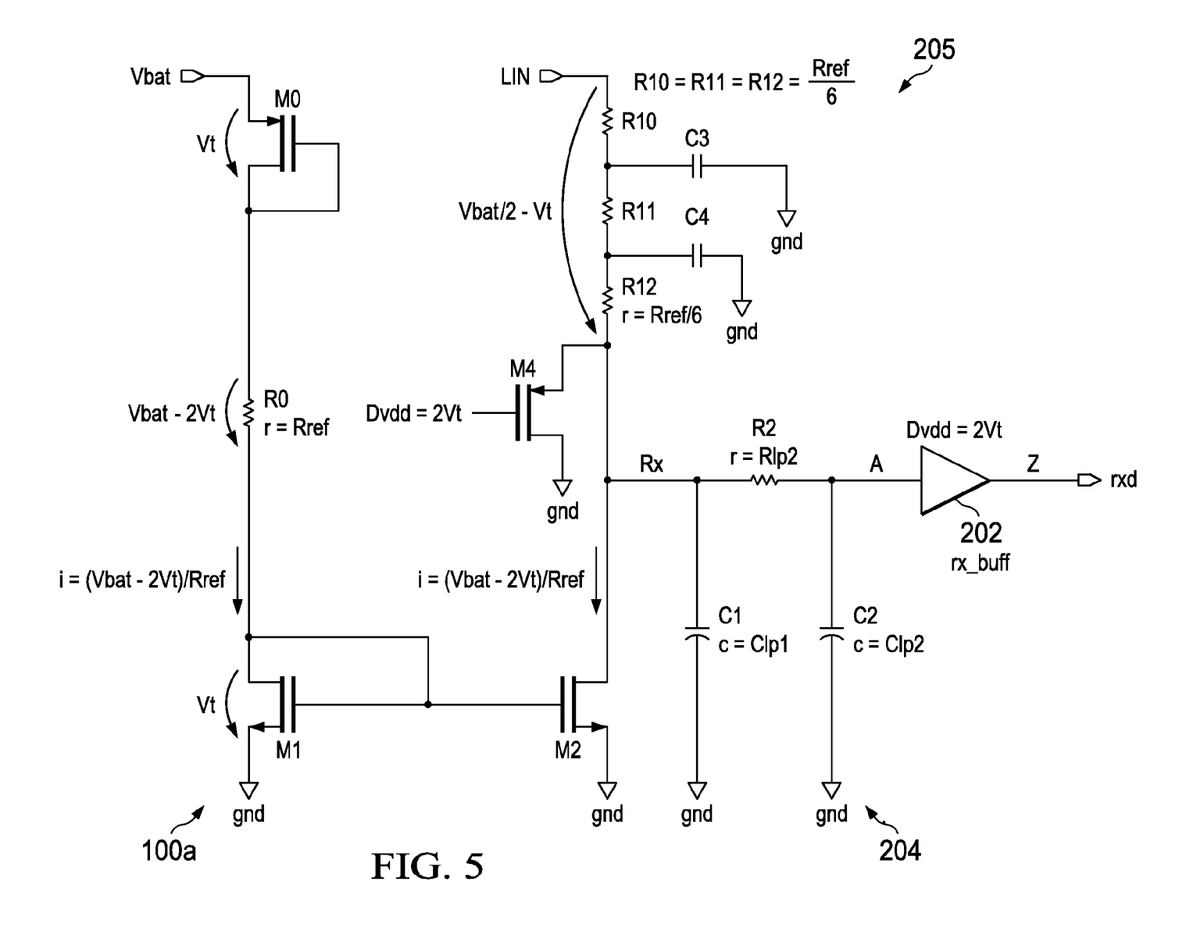
FIG. 5 is a diagram illustrating an exemplary receiver according to embodiments.

The above-described embodiments provide a simple and efficient way for detecting the bus level (recessive or dominant). However, it may additionally be necessary to consider the voltage swing at node RX. With the structure described in FIGS. 2A-2C and FIG. 3, the voltage at nodes RX and RX_LP (FIG. 3) will range from close to zero (gnd) during a dominant bus level up to close to Vbat/2 during a recessive level on the bus. This may exceed the safe input operating range of the digital buffer 202 that in many applications use low voltage (LV) devices. Therefore, some embodiments provide a clamping network at node RX. A receiver circuit according to embodiments implementing an exemplary clamp is shown in FIG. 5. It is noted that other clamping networks may be provided.

As shown in FIG. 5, an M4 PMOS device having its drain connected to ground, its gate connected to Dvdd supply (=2Vt), and its source connected to RX, is used. With M4, the voltage on node RX is now limited to 3Vt on the positive side, and it is limited to −Uj (where Uj is a junction voltage) on the negative side. With M4, the maximum swing range of node RX is thus restricted to (+3Vt, −Uj) range. Since the Vt voltage is almost equal to Uj in many implementations, this range can be rewritten as (+3Vt, −Vt). Thus, this range is almost centered on the receiver threshold that is equal to Vt. As shown, the clamping induces a symmetrical behavior versus the receiver threshold and thus prevents strong degradation of the receiver characteristics when HF interferences are superimposed to the original bus signal. However, a slight degradation may remain. Therefore, pre-filtering may be needed. A simple way for achieving this pre-filtering is shown in the receiver 205 of FIG. 5. The resistor R1=Rref/2 is now split into three series elements (R10, R11 and R12) of Rref/6, keeping its total value equal to Rref/2. In addition, two capacitors C3 and C4 are connected to the created intermediate points in order to implement this pre-filtering function.

It is noted that in the above descriptions, the current mirror ratio without hysteresis was set to 1 (Isense=Iref) and Rsense/Rref ratio was set to ½. That is, Rsense*Isense is equal to 0.5*Rref*Iref in order to have the voltage drop across the sense resistor equal to half the voltage across the reference resistance. Therefore, any current mirror Isense/Iref ratio may be used. The only condition to fulfill is having Rref/Rsense=2*Isense/Iref (or Isense/Iref=0.5*Rref/Rsense), where Isense/Iref is the mirroring ratio without hysteresis.

High voltage (HV) capacitors may be required for the pre-filtering network. Usually HV capacitors have poor sheet capacitance and may require significantly larger layout area than Rsense (R10+R11+R12) area for meeting the required RC time constant of the pre-filtering network. Therefore, in some implementations, the Rsense value and HV capacitor value are determined based on which values will provide the smallest overall layout area for the pre-filtering section. The current mirror gain (G) may then be determined using the following equation: G=Isense/Iref=0.5*Rref/Rsense (without hysteresis).

Figure 6:
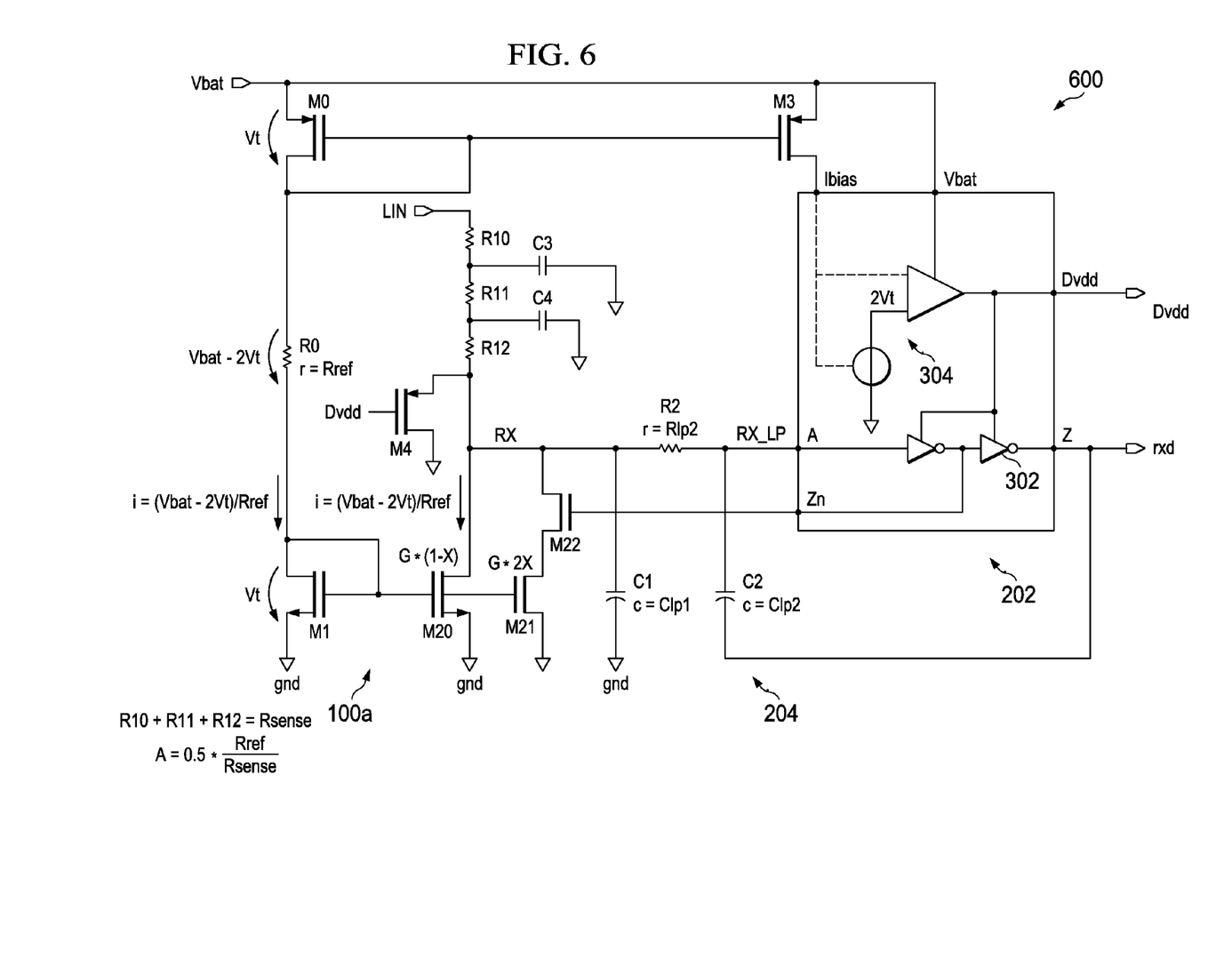
FIG. 6 is a diagram illustrating an exemplary receiver according to embodiments.

FIG. 6 shows a schematic of a simple very low power LIN receiver 600 based on various of the techniques described above.

It is noted that the high level of rxd signal available at the output of this receiver is equal to 2Vt, which may be a too low level to be processed by the rest of the whole transceiver circuitry (not shown). Therefore in many applications it will be applied to a level-shifter that will convert it up to the required level for processing by the rest of the transceiver circuitry. Techniques for level-shifting up signals are well known and thus are not described here.

Figure 7:
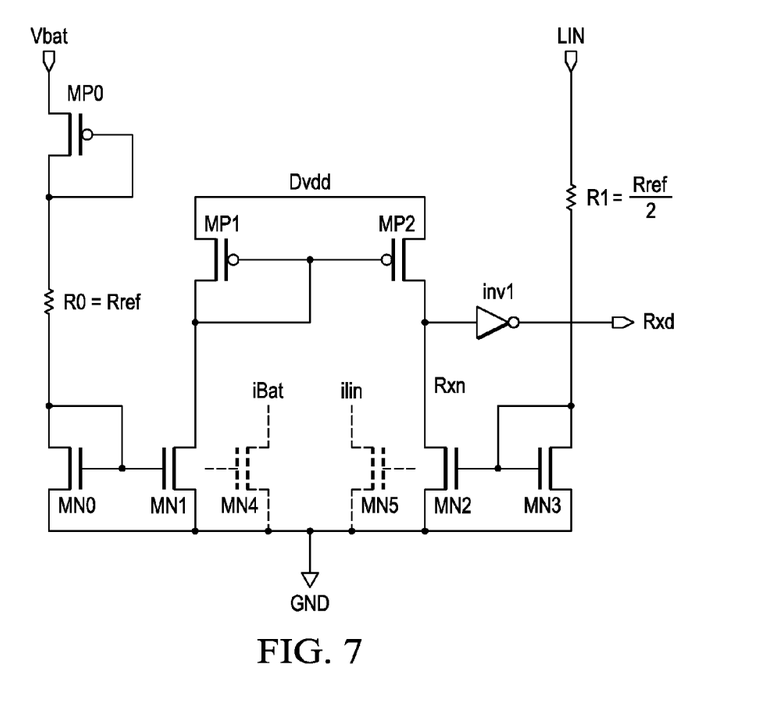
FIG. 7 is a diagram illustrating an exemplary circuit according to embodiments.

In some embodiments, rather than a clamp, a dual mirror current mode approach can be used. Such a circuit is shown in FIG. 7. The sensing Vbat section based on compensating diode MP0, reference resistor R0, and reference current mirror MN0, MN1 is unchanged. However the sense resistor R1 is now connected to the input of a LIN MN3, MN2 mirror. The MN1 output reference current is mirrored in a MP1, MP2 mirror and summed with LIN current mirror output (MN2 output current), creating a current comparator. The current comparator has an inverted output. Thus inverter inv1 is provided to restore the correct polarity of the Rxd received signal. In the embodiment illustrated, all current mirror ratios are assumed to be 1 and MP1/MP2 current mirror is supplied by the digital Dvdd supply voltage, but any other supply voltage may be used.

In operation, when the LIN bus voltage is greater than Vbat/2 (recessive), the current in the sense resistor R1 is greater than the current in the reference resistor R0. The MN2 current is thus larger than the MP2 current and the Rxn node is low. Once inverted, the Rxd output is high reflecting a recessive level on the LIN bus. When the LIN bus voltage is less than Vbat/2 (dominant) the LIN sense current is lower than the reference current. The MN2 current is thus lower than the MP2 current and Rxn node is high. Once inverted, the Rxd output is high reflecting a dominant level on the bus. With this approach, battery and bus voltage info may be provided through additional MN4 and MN5 transistors (dashed).

As noted above, in the embodiment of FIG. 7, the mirrors ratios without hysteresis may be set to 1 for simplicity. In some embodiments, they can differ from 1. Without hysteresis, the rule to apply is Gain(MN2/MN3)=2*R1/R0*Gain (MN1/MN0)*Gain(MP2/MP1) in order to have the voltage drop across the sense resistor R1 equal to half the voltage across the reference resistance R0.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A local interconnect network receiver, comprising:
   a battery voltage input;

an input from a local interconnect network (LIN) bus; and
a current mirror configured to mirror a current defined by a reference resistor coupled to the battery voltage input in a sense resistance, such that a voltage at an output point of the sense resistance defines dominant and recessive states of the LIN bus in active, silent and sleep modes.

2. The local interconnect network receiver of claim 1, including a diode connected between the battery voltage input and the reference resistor.

3. The local interconnect network receiver of claim 1, wherein the sense resistance has half a value of the reference resistor.

4. The local interconnect network receiver of claim 2, including a lowpass filter coupled at the output point of the sense resistance.

5. The local interconnect network receiver of claim 3, wherein the sense resistance comprises a single resistor.

6. The local interconnect network receiver of claim 3, wherein the sense resistance comprises a plurality of resistors.

7. The local interconnect network receiver of claim 6, further including a plurality of capacitors at intermediate points between the resistors.

8. The local interconnect network receiver of claim 4, further including circuitry for compensating for voltage swing at an input of the lowpass filter.

9. The local interconnect network receiver of claim 8, wherein the circuitry for compensating for voltage swing comprises a clamping network.

10. The local interconnect network receiver of claim 8, wherein the circuitry for compensating for voltage swing comprises dual mirror common mode circuitry.

11. The local interconnect network receiver of claim 4, including an output buffer coupled to the lowpass filter and having a input threshold corresponding to a voltage drop across the diode.

12. The local interconnect network receiver of claim 11, wherein the diode is a diode-connected MOS transistor.

13. The local interconnect network receiver of claim 1, wherein power consumption is substantially equal at both sleep and silent modes.

14. The local interconnect network receiver of claim 1, the current mirror implementing hysteresis by switchably selecting differing mirroring ratios.

15. A local interconnect network (LIN) receiver, comprising:
a common circuit configured to detect dominant and recessive states of a LIN bus during active, silent and sleep modes, wherein the common circuit includes a current mirror configured to mirror a current defined by a reference resistance coupled to a battery voltage input in a sense resistance, such that a voltage at an output point of the sense resistance defines dominant and recessive states of the LIN bus.

16. The local interconnect network receiver of claim 15, including a diode connected between the battery voltage input and the reference resistance.

17. The local interconnect network receiver of claim 16, wherein the mirroring ratio and the ratio between the reference and the sense resistance are sized in such a way that the voltage drop across the sense resistance is half the voltage drop across the reference resistance.

18. The local interconnect network receiver of claim 17, including a lowpass filter coupled at the output point of the sense resistance.

19. The local interconnect network receiver of claim 17, wherein the sense resistance comprises a single resistor.

20. The local interconnect network receiver of claim 17, wherein the sense resistance comprises a plurality of resistors.

21. The local interconnect network receiver of claim 20, further including a plurality of capacitors at intermediate points between the resistors.

22. The local interconnect network receiver of claim 18, further including circuitry for compensating for voltage swing at an input of the lowpass filter.

23. The local interconnect network receiver of claim 22, wherein the circuitry for compensating for voltage swing comprises a clamping network.

24. The local interconnect network receiver of claim 22, wherein the circuitry for compensating for voltage swing comprises dual mirror common mode circuitry.

25. The local interconnect network receiver of claim 18, including an output buffer coupled to the lowpass filter and having a input threshold corresponding to a voltage drop across the diode.

26. The local interconnect network receiver of claim 25, wherein the diode is a diode-connected MOS transistor.

27. The local interconnect network receiver of claim 15, wherein power consumption is substantially equal at both sleep and silent modes.

28. The local interconnect network receiver of claim 15, wherein current consumption during sleep mode is proportional to a battery voltage.

29. The local interconnect network receiver of claim 15, the current mirror implementing hysteresis by switchably selecting differing mirroring ratios.

30. A method, comprising:
operating a local interconnect network (LIN) receiver in a sleep mode;
operating the LIN receiver in a silent mode;
operating the LIN receiver in an active mode;
wherein operating in the sleep mode and operating in the silent and active modes comprise detecting dominant and recessive states of a LIN bus using a common circuit; and
wherein the common circuit includes a current mirror configured to mirror a current defined by a reference resistance coupled to a battery voltage input in a sense resistance, such that a voltage at an output point of the sense resistance defines dominant and recessive states of the LIN bus.

31. The method of claim 30, including a diode connected between the battery voltage input and a reference resistance.

32. The method of claim 31, wherein the mirroring ratio and the ratio between the reference and the sense resistance are sized in such a way that the voltage drop across the sense resistance is half the voltage drop across the reference resistance.

33. The method of claim 31, including a lowpass filter coupled at the output point of the sense resistance.

34. The method of claim 32, wherein the sense resistance comprises a single resistor.

35. The method of claim 32, wherein the sense resistance comprises a plurality of resistors.

36. The method of claim 35, further including a plurality of capacitors at intermediate points between the resistors.

37. The method of claim 33, further including circuitry for compensating for voltage swing at an input of the lowpass filter.

38. The method of claim 37, wherein the circuitry for compensating for voltage swing comprises a clamping network.

39. The method of claim 37, wherein the circuitry for compensating for voltage swing comprises dual mirror common mode circuitry.

40. The method of claim 33, including an output buffer coupled to the lowpass filter and having a input threshold corresponding to a voltage drop across the diode.

41. The method of claim 31, wherein the diode is a diode-connected MOS transistor.

42. The method of claim 30, wherein power consumption is substantially equal at both sleep and silent modes.

43. The method of claim 30, wherein current consumption during sleep mode is proportional to a battery voltage.

44. The method of claim 30, the current mirror implementing hysteresis by switchably selecting differing mirroring ratios.

* * * * *